United States Patent
Masuda et al.

(10) Patent No.: US 6,822,431 B2
(45) Date of Patent: Nov. 23, 2004

(54) INTRINSICALLY SAFE SENSOR SIGNAL PROCESSING CIRCUIT

(75) Inventors: Takashi Masuda, Tokyo (JP); Yasuhide Yoshikawa, Tokyo (JP)

(73) Assignee: Yamatake Corporation, Tokyo (JP)

(*) Notice: Subject to any disclaimer, the term of this patent is extended or adjusted under 35 U.S.C. 154(b) by 0 days.

(21) Appl. No.: 10/069,547

(22) PCT Filed: Jul. 4, 2001

(86) PCT No.: PCT/JP01/05835
§ 371 (c)(1),
(2), (4) Date: Jul. 16, 2004

(87) PCT Pub. No.: WO03/005319
PCT Pub. Date: Jan. 16, 2003

(65) Prior Publication Data
US 2004/0113635 A1 Jun. 17, 2004

(51) Int. Cl.[7] ............................................. G01R 31/02
(52) U.S. Cl. ..................... 324/72; 324/672; 324/705
(58) Field of Search ..................... 324/72, 73.1, 672, 324/679, 705; 73/31.03–31.05; 361/52; 379/167.01

(56) References Cited

U.S. PATENT DOCUMENTS

| 3,611,127 A | * | 10/1971 | Vosteen ........................ 324/72 |
| 3,845,356 A | * | 10/1974 | Bullard et al. ................ 361/52 |
| 3,997,733 A | * | 12/1976 | Sanders ....................... 379/176 |

* cited by examiner

Primary Examiner—Vincent Q. Nguyen
(74) Attorney, Agent, or Firm—Whitham, Curtis & Christofferson, P.C.

(57) ABSTRACT

Disclosed is an intrinsically safe sensor signal processing circuit, permitting lower cost installation and eliminating potential hazard. In the combination of a sensor which measures physical value as process variables in hazardous environment and a safety barrier which is mounted in non-hazardous environment, an intrinsically safe sensor signal processing circuit features the safety barrier for case of mounting, wherein current limiting resistances are connected in series with the sensor and these resistances are also connected to either an output or an inverting input of OP Amps that are considered as a driver or a feeder of the sensor signal. The safety barrier can adopt blocking capacitors instead of said current limiting resistors.

4 Claims, 4 Drawing Sheets

INTRINSICALLY SAFE SENSOR SIGNAL PROCESSING CIRCUIT

BACKGROUND OF THE INVENTION

1. Field of the Invention

This invention generally relates to a sensing method and apparatus and, more specifically, to a physical value sensor for use in an explosive atmosphere.

2. Background Description

A sensor is made of resistive or capacitive impedances related to a physical value, i.e., pressure, temperature, flow, etc., to be measured in an environment. This kind of sensor is an electrically passive element, that is to say, the sensor needs to be driven by an external power supply. A sensor signal processor receives a signal response from the sensor and generates a measured output. In the case where the sensor must be put in a hazardous area, the sensor signal processor is designed to provide protection against high currents or voltages to the sensor.

A hazardous area is defined as an area in which explosive atmospheres are, or may be expected to be, present in quantities such as to require special precaution for the construction and use of electrical equipment. Intrinsic safety is a protection concept employed in applications involving a potentially explosive atmosphere. Intrinsic safety relies on the electrical apparatus being designed so that it is unable to release sufficient energy, by electrical means, to cause an ignition of a flammable gas, for example. In electrical circuits, the mechanisms for the release of this ignition energy are an open circuit or a short circuit of components, interconnections in a circuit, and so on.

To realize intrinsic safety, a safety barrier may be designed in a non-hazardous area by relatively large circuits with energy limiting resistors, zener diodes, fuses, and so on. Then there were some problems in distinguishing the true impedance of the sensor from current limiting impedances, and imprecise measurement is caused by the noise effects chiefly coming from temperature characteristics of those impedances.

A technology to realize intrinsic safety by blocking capacitors has been tried in another technical field, specifically that of a microwave band antenna barrier invention as described in Japanese laid open application JP10-013130. A blocking capacitor is known to be effective to take care of an alternating current (AC) modulated signal since it blocks direct current (DC) voltages. However, in this application, the sensor has been ordinarily driven by DC power, which treats a small change of physical value, and it has been difficult to avoid its large conductance change noise.

Heretofore, it has been easy and certain to install a safety zener barrier so as to cover a sensor device as a whole from the external layer a power supply belongs to. But such an instrumentation that requires an external barrier may be a big thing because of wiring cost and space factors for mounting.

SUMMARY OF THE INVENTION

In view of foregoing, it is an object of the present invention to provide a sensor signal processing circuit which itself contains a safety barrier that limits the current energy so as not to ignite an explosive environment where a sensor element exists, especially by making the safety barrier low cost and compact enough to be mounted in a non-hazardous area or in an enclosure in the hazardous area. This safety barrier allows for the sensor signal processing circuit that would otherwise not be able to achieve intrinsic safe level approvals to attain such approvals standardized by official agencies.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
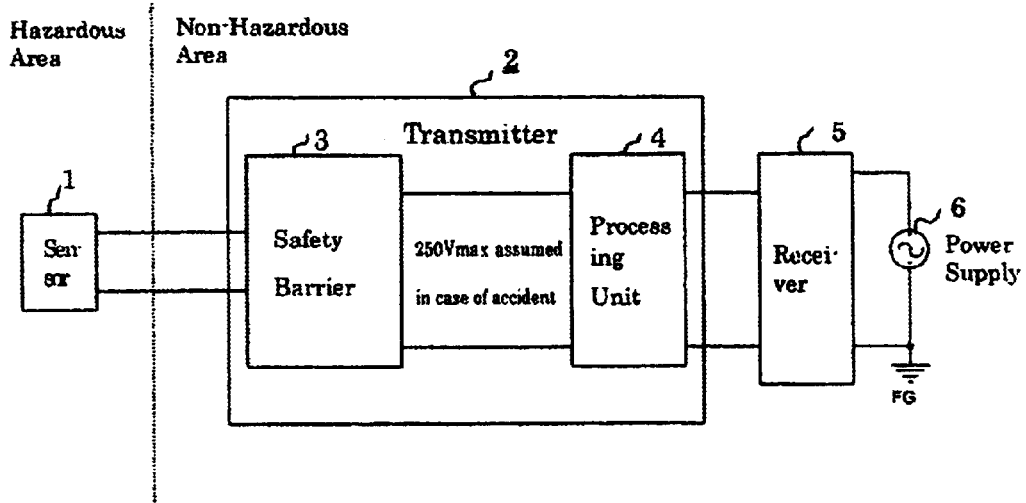
FIG. 1 is a block diagram illustrating the case wherein only a sensor element exists in hazardous area.

Referring now to the drawings, and in particular to FIG. 1, there is shown a diagram wherein only a sensor element 1 exists in a hazardous area. The sensor signal processing circuit is located in the non-hazardous area. Typically, the signal processing circuit comprises a transmitter 2 and a receiver 5. The transmitter 2 includes a safety barrier 3 and a processing circuit 4. All the active elements, i.e., the transmitter and receiver are connected to a power supply 6 and field ground FG.

Figure 2:
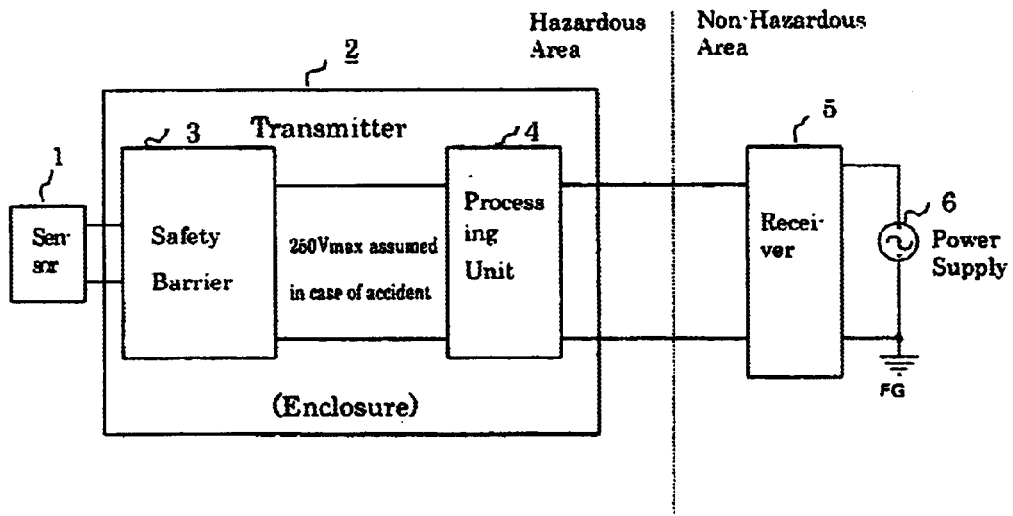
FIG. 2 is a block diagram illustrating the case wherein a sensor element exists in hazardous area and a transmitter including a safety barrier exists in an enclosure in hazardous area.

Alternatively, referring to the drawing FIG. 2, there is shown a diagram wherein a sensor element 1 exists in a hazardous area and a transmitter 2 including a safety barrier 3 exists in an enclosure in the hazardous area, while the receiver 5 is in the non-hazardous area. In both cases, there is shown a conceptual diagram that a sensor element has no power, essentially to realize intrinsic safety.

Figure 3:
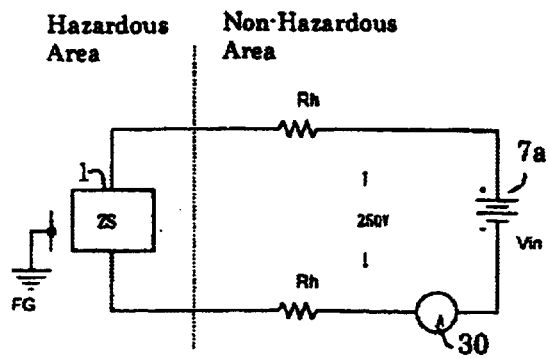
FIG. 3 is a block and schematic diagram illustrating a conventional intrinsic safety circuit using current limiting resistors (Rh)

FIG. 3 shows a prior art circuit where current limiting resistors (Rh) limit the current in the event of failure of the sensor. Assuming that a maximum voltage up to 250V(DC or AC commercial power supply) was applied, current limiting resistors work to decrease the rush current into hazardous area. This voltage may be suppressed by a zener diode (not shown in the drawing), or only current may be limited to suppress the rush energy. The current value is normally calculated as Equation (1) because of the Thevenin's theorem with not only the sensor impedance (ZS) but also current limiting resistors (Rh). The measured current, I, in amperes is considerably affected by a temperature characteristic of Rh in this case:

$$I = \frac{Vin}{ZS + 2 \times Rh} \quad (1)$$

Now, according to the invention, there are two approaches to solve the problem of an applied current rush. The first approach is, like FIG. 4, to provide two operational amplifiers (OP Amps), the driver 10 and the feeder 20, between the sensor terminal and the signal line to the processing unit, so that current resistors impedance can be ignored, provided that the OP Amps must be ideal enough to regard OP Amp open gain, Av, as an infinitly large, input impedance as infinitly large and output impedance as zero. (OP Amp characteristics are considered ideal in the description which follows.) As a result, the normal sensor voltage at the sensor terminals A and B could be Equations (2) and (3):

$$Va = Vin \quad (2)$$

$$Vb = 0 \quad (3)$$

Therefore, the current I measured by the ampere meter 30 (A) is as given in Equation (4). The sensor impedance (ZS) that leads to the measured physical value is calculated from Equation (4) without any effect of impedance Rh:

$$I = \frac{Vin}{ZS} \quad (4)$$

Figure 5:
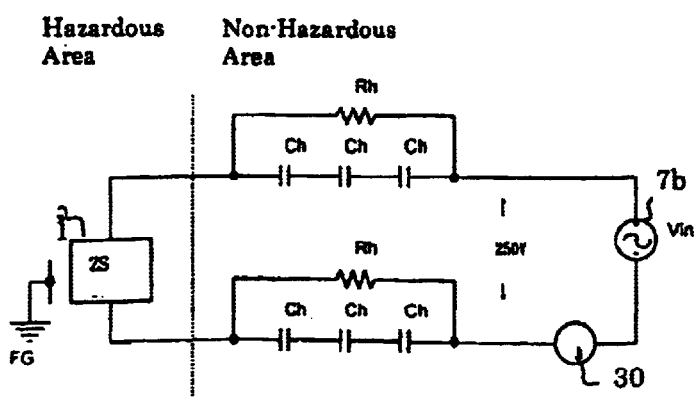
FIG. 5 is a block and schematic diagram illustrating a second embodiment of the present invention with blocking capacitors (Ch) without OP Amps.

Next, the second approach is, like FIG. 5, to realize the current limiting without having a large resistance. In this case, the driving voltage 7b (Vin) may be AC, but higher frequency than supplied power frequencies 50/60 Hz, and the blocking capacitors (Ch) are connected in parallel with the current limiting resistances (Rh). These capacitors' impedance may be anti-proportional to a supplied frequency, so it is possible for the blocking capacitors impedance to be low enough to ignore in a normal mode and to be large enough to limit the current through the sensor 1. The measured current normally in FIG. 5 is as in Equation (5) according to the Thevenin's theorem:

$$I = \frac{1}{ZS + \dfrac{2 \times Rh}{1 + \frac{1}{3} \times j\omega Ch \times Rh}} \times Vin \quad (5)$$

Now, providing the normal measuring frequency $\omega(=2\pi f)$ is made much higher than 1 kHz and relatively larger than Ch or Rh, the second item of the divisor can be neglected as Equation (6):

$$I = \frac{Vin}{ZS} \quad (6)$$

In summary, this sensor signal processing circuit provides a solution to realize intrinsic safety with a precise measurement, by means of driving the sensor with a driver and feeder OP Amps and by means of blocking capacitors having a negligible impedance at high frequencies.

The above and further objects and novel features of the invention will more fully appear from the following detailed description when the same is read in connection with the accompanying drawings. It is to be expressly understood, however, that the drawings are for the purpose of illustration only and are not intended as a definition of the limits of the invention.

Figure 4:
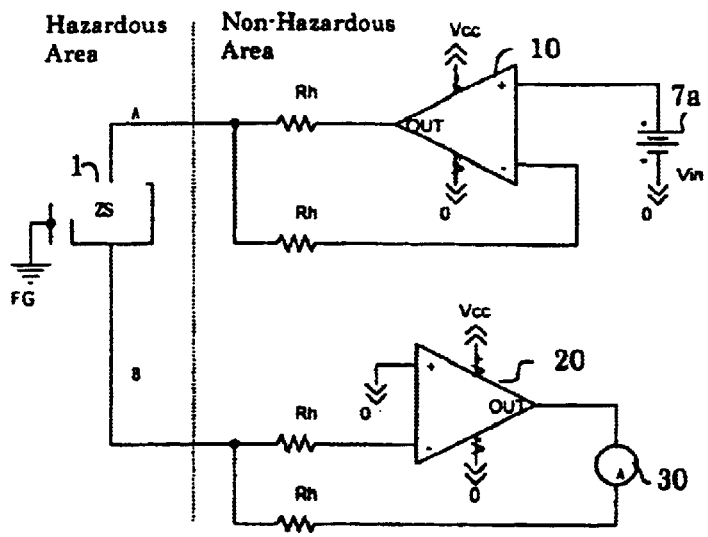
FIG. 4 is a block and schematic diagram illustrating a first embodiment of the present invention with current limiting resistors (Rh) and operational amplifiers (OP Amps) to get a sensor signal as a current value.

FIG. 4 shows the sensor signal processing circuit relating to the first approach described above. The driver OP Amp 10, as an output buffer, drives the supplied voltage 7a (Vin) toward the sensor 1. The feeder OP Amp 20 measures the feedback current passed through from the sensor. As a result of Equation (4), the sensor impedance (ZS) can be obtained from the given Vin, and the measured current I can be obtained from meter 30 (A).

Assuming that all other components except current limiting resistors (Rh) failed (e.g., short circuit, open circuit, etc.) and each Rh had an applied voltage of 250V, the number of rush current paths to the hazardous area may be the four current limiting resistors (Rh). It is required to limit the current from any of the four current limiting resistors through the sensor 1 toward ground (FG) to 10 mA or less, for instance, so as to avoid an explosion as specified by a safety Class requirement. The four current limiting resistors (Rh) may be more than 100 KΩ to limit the current from every Rh to below 2.5 mA. This example is common in the further embodiments.

The second embodiment of the present invention is shown in FIG. 5. FIG. 5 shows the sensor signal processing circuit relating to the second approach described above. By the effect of blocking capacitors (Ch), the current through the sensor 1 is normally as given by Equation (6), and it can be limited as small as Equation (5) even though the power voltage is superposed onto the driving voltage (Vin). Yet the blocking capacitors (Ch) may be on two stacks or more in series to meet the intrinsic safety regulations. Here the resistors (Rh) are added for current limiting and DC bias use.

Assuming that all of the resistors (Rh) and the blocking capacitors (Ch) have an applied voltage of 250V, it is required to limit the current from those elements through the sensor toward ground (FG) to 10 mA. The number of current path is four, as before. So two resistors (Rh) may be more than 100 KΩ to limit the current to 2.5 mA and at least one surviving capacitor (Ch) on the parallel current path may be less than 26 nF to limit the current to 2.5 mA which is calculated as the multiplier of $2\pi fxCh$ and 250V, in this example. (Here, $\omega=2\pi f$, and f may be a commercial power frequency of 60 Hz.)

Figure 6:
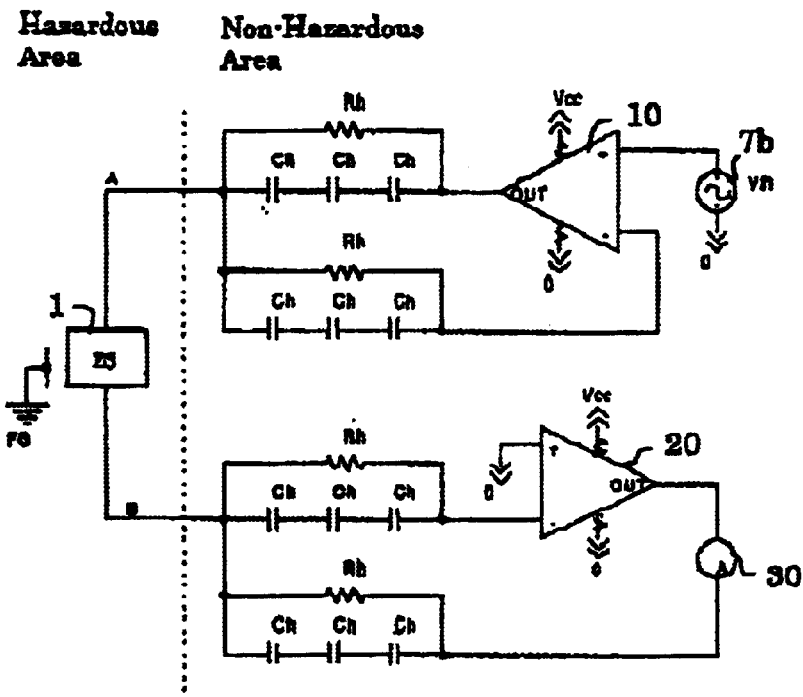
FIG. 6 is a block and schematic diagram illustrating a third embodiment of the present invention with blocking capacitors (Ch) and OP Amps to get a sensor signal as a current value.

The third embodiment of the present invention is shown in FIG. 6. FIG. 6 shows the sensor signal processing circuit relating the combination of said first and second approaches as described above. This makes the blocking capacitors (Ch) negligible by using the OP Amps regardless of the frequency of $\omega$. The measurement by this embodiment is as in following Equation (7) because it is based on the same theory from Equations (2) and (3). OP Amps are assumed ideal, the same as before:

$$I = \frac{Vin}{ZS} \quad (7)$$

The driver OP Amp 10 and the feeder OP Amp 20 have respectively the current limiting resistors (Rh) and the blocking capacitors (Ch) on all lines towards the sensor 1.

Assuming that all other components except current limiting resistors (Rh) or blocking capacitors (Ch) failed (e.g., short circuit, open circuit, etc.) and each Rh and Ch had an applied voltage of 250V, the number of current paths may be as many as eight. It is required to limit the current through the sensor toward ground (FG) to 10 mA. The four current limiting resistors Rh may be more than 200 KΩ to limit the current from every current limiting resistor Rh to 1.25 mA, and every Ch may be less than 13 nF, similarly as in the above example.

In the above embodiments, specifically the first embodiment, a current meter achieves the measurement. However, a current measurement is not practical for some circuitry, as compared to a voltage measurement. And it is not favorable to measure simply the output of the feeder OP Amp in FIG. 4 because of the dependency of the precision of current limiting resistor (Rh) as Equation (8) as follows:

$$V = \frac{Rh}{ZS} \times Vin \qquad (8)$$

Figure 7:
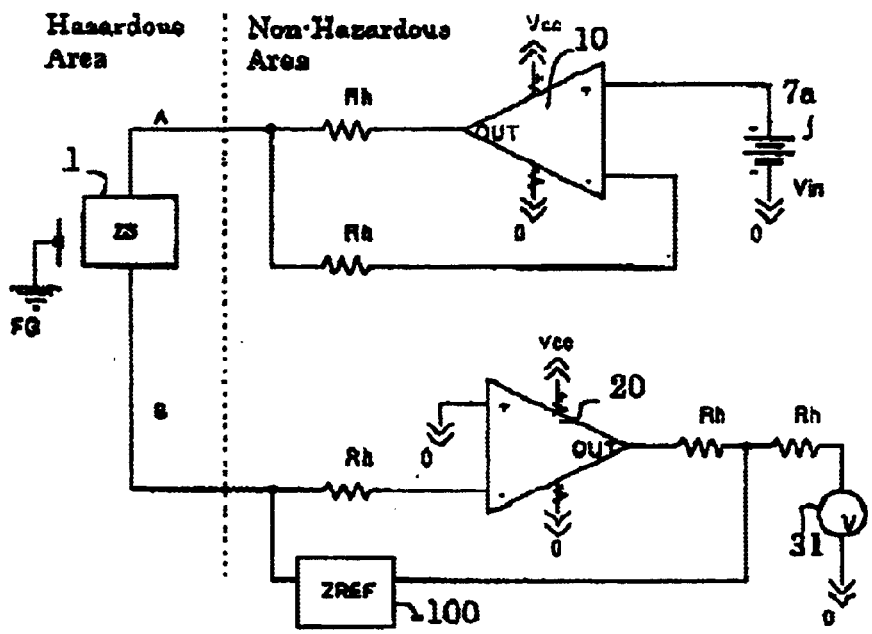
FIG. 7 is a block and schematic diagram illustrating a fourth embodiment of the present invention as improved from a first embodiment (FIG. 4), to get a sensor signal as a voltage value.

Therefore, an improvement of the first embodiment of the invention is preferred as shown in FIG. 7, wherein a reference resistor 100 (ZREF) is used for generating a negative feedback signal in OP Amp 20. The output of OP Amp 20 can be obtained as Equatioin (9) with no Rh factor, so the sensor impedance (ZS) can be calculated precisely:

$$V = \frac{ZREF}{ZS} \times Vin \qquad (9)$$

The points to which a high voltage are applied in case a component failure are outputs and inputs of OP Amps 10 and 20 from which current limiting resistors are coupled to the sensor. Assuming that all other components except current limiting resistors (Rh) failed and each Rh had an applied voltage of 250V, the number of current paths maybe five. It is required to limit the current through the sensor 1 toward the ground (FG) to 10 mA. The five current limiting resistors Rh may be more than 125 KΩ to limit the current from every Rh to 2 mA, for instance.

Furthermore, the reference resistor 100 (ZREF) has nothing to do with intrinsic safety and may have almost same value as the sensor. (This is common in the next fifth embodiment.) It may be a capacitive element instead of resistors.

In the above third embodiment, the measurement is achieved by a current meter, and it is not favorable to measure simply the output of the feeder OP Amp in FIG. 6 because of the dependency of the precision of resistors (Rh), capacitors (Ch) and sensor (ZS) impedances as Equation (10) as follows:

$$V = \frac{Rh}{ZS\left(1 + \frac{1}{3} j\omega Ch \times Rh\right)} \times Vin \qquad (10)$$

Figure 8:
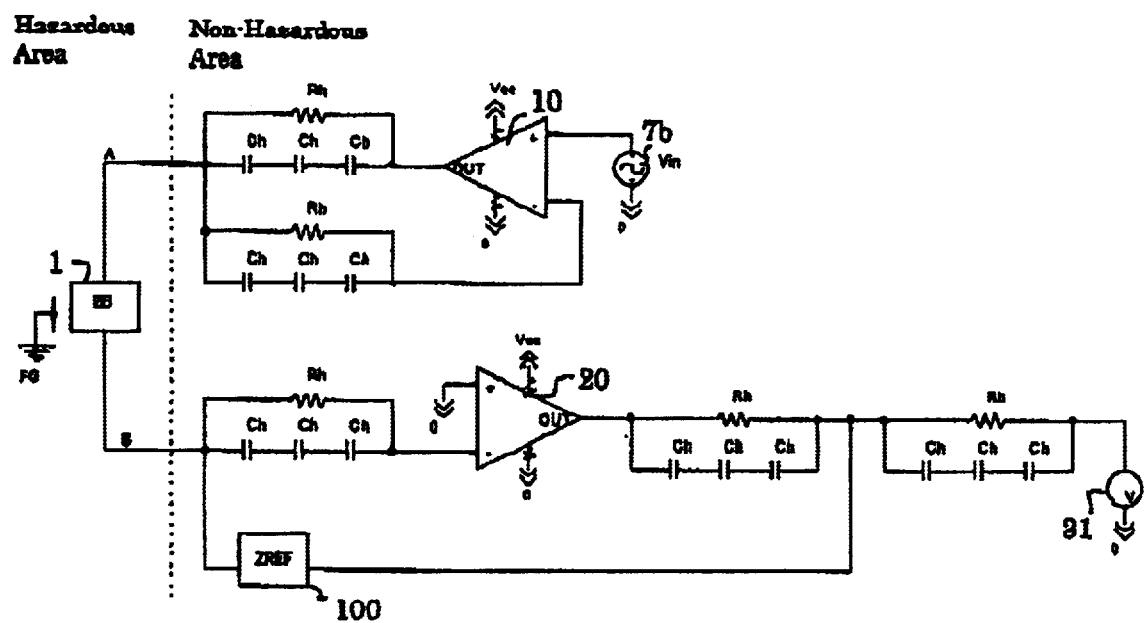
FIG. 8 is a block and schematic diagram illustrating a fifth embodiment of the present invention as improved from a third embodiment (FIG. 6), to get a sensor signal as a voltage value.

This does not provide the precise measurement of ZS, since output V contains Rh and Ch factors. Therefore, the improvement of the third embodiment of the invention is preferred as shown in FIG. 8, to add a reference resistor 100 (ZREF) for generating a negative feedback for OP Amp 20. The output of OP Amp 20 can be obtained as Equation (11) without Rh or Ch factors, so the sensor impedance (ZS) can be calculated precisely:

$$V = \frac{ZREF}{ZS} \times Vin \qquad (11)$$

The same as in the fourth embodiment, current limiting resistors (Rh) and blocking capacitors (Ch) are set between the outputs of OP Amps 10 and 20 and sensor 1 for intrinsic safety. Assuming that all other components except current limiting resistors (Rh) or blocking capacitors (Ch) failed and each Rh and Ch had an applied voltage of 250V, the number of current paths may be as many as ten. It is required to limit the current through the sensor toward ground (FG) to 10 mA. The five current limiting resistors Rh may be more than 250 KΩ to limit the current from every current limiting resistor Rh to 1 mA, and every blocking capacitor Ch may be less than 10 nF, similarly to the previous example.

Additionally, the above noted parameters of Rh and Ch do not limit this invention. Furthermore, the included safety barrier in the circuit can be applied in plants, manufacturing processes or laboratories in especially dangerous environments (e.g., gaseous, ignitable, etc.).

While the invention has been described in terms of preferred embodiments, those skilled in the art will recognize that the invention can be practiced with modification within the spirit and scope of the appended claims.

Having thus described our invention, what we claim as new and desire to secure by Letters Patent is as follows:

1. An intrinsically safe sensor signal processing circuit, comprising:
   a sensor means to measure a physical value in a hazardous area;
   a safety barrier means mounted in a non-hazardous area or in an enclosure housing in the hazardous area;
   a plurality of current limiting resistors located inside of the safety barrier, connected in series with the sensor;
   a first operational amplifier located inside of the safety barrier, as a driver of the sensor signal, coupling a first group of the current limiting resistors between an output and an inverting-input of the first operational amplifier; and
   a second operational amplifier located inside of the safety barrier, as a feeder of the sensor signal, coupling a second group of the current limiting resistors between an output and an inverting-input of the second operational amplifier.

2. The sensor signal processing circuit of claim 1, wherein a reference resistor is connected between a feeding line directly coupled from the sensor and a current limiting resistor coupled the output of the second operational amplifier in order to generate an output sensor signal as a voltage value by negative feedback.

3. An intrinsically safe sensor signal processing circuit, comprising:
   a sensor means to measure a physical value in a hazardous area;
   a safety barrier means mounted in a non-hazardous area or in an enclosure housing in the hazardous area;
   a plurality of blocking capacitors for current limiting located inside of the safety barrier, connected in series with the sensor;
   a first operational amplifier located inside of the safety barrier, as a driver of the sensor signal, coupling a first group of the blocking capacitors between an output and an inverting-input of the first operational amplifier; and
   a second operational amplifier located inside of the safety barrier, as a feeder of the sensor signal, coupling a second group of the blocking capacitors between an output and an inverting-input of the second operational amplifier.

4. The sensor signal processing circuit of claim 3, wherein a reference resistor is connected between a feeding line directly coupled from the sensor and a blocking capacitor coupled to the output of the second operational amplifier in order to generate an output sensor signal as a voltage value by negative feedback.

* * * * *